United States Patent [19]

Gunderson et al.

[11] Patent Number: 4,892,337

[45] Date of Patent: Jan. 9, 1990

[54] FATIGUE-RESISTANT THREADED CONNECTOR

[75] Inventors: Richard H. Gunderson, Houston, Tex.; Jerome Q. Burns, San Diego, Calif.; Stewart A. Fox, Houston, Tex.

[73] Assignee: Exxon Production Research Company, Houston, Tex.

[21] Appl. No.: 207,687

[22] Filed: Jun. 16, 1988

[51] Int. Cl.$^4$ .............................................. F16L 15/00
[52] U.S. Cl. .................................... 285/333; 285/332; 285/369; 285/417
[58] Field of Search ..................... 285/333, 334, 334.4, 285/332, 328, 332.3, 369, 417

[56] References Cited

U.S. PATENT DOCUMENTS

| | | | |
|---|---|---|---|
| 2,051,499 | 8/1936 | Siegle | 285/146 |
| 2,094,491 | 9/1937 | Janata | 285/146 |
| 2,196,966 | 4/1940 | Hammer | 285/146 |
| 2,508,306 | 5/1950 | Thurston et al. | 285/146 |
| 3,083,043 | 3/1963 | Thornhill | 285/333 |
| 3,109,672 | 11/1963 | Franz | 285/334 |
| 3,210,096 | 10/1965 | Van Der Wissel | 285/334 |
| 4,076,436 | 2/1978 | Slator et al. | 403/343 |
| 4,473,245 | 9/1984 | Raulins et al. | 285/334 |
| 4,508,375 | 4/1985 | Patterson et al. | 285/334 |
| 4,537,429 | 8/1985 | Landriault | 285/334 |
| 4,540,314 | 9/1985 | Falkner | 405/227 |
| 4,601,491 | 7/1986 | Bell, Jr. et al. | 285/24 |
| 4,708,513 | 11/1987 | Roche et al. | 403/361 |

FOREIGN PATENT DOCUMENTS 786652  11/1957  United Kingdom ................ 285/333

OTHER PUBLICATIONS

Carlin, F. and Saunders, D., "Tool-Joint Thread Redesign Cuts Stress, Increases Fatigue Life", Oil & Gas Journal, Jul. 22, 1985, pp. 75-78.
Daly, R., "Even Loading for Premium Thread", The Oilman, Mar., 1985, pp. 40 and 41.
Goodier, J. N., "The Distribution of Load on the Threads of Screws", Journal of Applied Mechanics, Mar., 1940, pp. A-10-A-16.
Hetenyi, M., "A Photoelastic Study of Bolt and Nut Fastenings", Journal of Applied Mechanics, Jun., 1943, pp. A-93-A-100.
Sakaguchi, I., et al., "Dynamic Response Analysis and Fatigue Life Prediction of TLP Tension Legs", Proceedings of the 5th ASME et al. Offshore Mechanics & Arctic Engineering International Symposium, Tokyo, Japan, Apr. 13-18, 1986, v. 3, pp. 108-114.
Skilbeck, F., et al., "Design and Manufacture of Couplings for the Hutton TLP Mooring System", Paper No. OTC 4946 presented at the 17th Annual OTC in Houston, Texas, May 6-9, 1985.
Sopwith, D. G., "The Distribution of Load in Screw Threads", Proceedings of the Institute of Mechanical Engineers, 1948, vol. 159 (War Emergency Issue n 45), pp. 373-383.
Stoeckly, E. E. and Macke, H. J., "Effect of Taper on Screw-Thread Load Distribution", Transactions of the ASME, Jan., 1952, pp. 103-112.

Primary Examiner—Randolph A. Reese
Assistant Examiner—Anthony Knight
Attorney, Agent, or Firm—Keith A. Bell

[57] ABSTRACT

A fatigue-resistant threaded connector for connecting adjacent sections of a tubing string subject to cyclic dynamic stress variations is disclosed. The connector comprises a pin member which is threadedly engageable with a corresponding box member. In its preferred embodiment, the connector is radially preloaded. The connector has tapered threads with a straight load path having substantially no eccentricity. The preferred thread form is a modified buttress thread having a zero (or near zero) degree load flank, a 45 degree stab flank, and a large root radius. Additionally, the thread may include a small stab flank relief to reduce stress concentrations, and a differential between the pitch of the pin threads and the pitch of the box threads to compensate for the Poisson's ratio effect of the radial preload. The connector utilizes an elliptical stress relief groove at the base of the pin threads and elliptical contours on all thickness transitions to reduce peak stresses. The fully assembled and preloaded connector has a maximum stress-concentration-factor of less than 1.5 and its weight is less than 2.5 times the weight of an equivalent length of tubing.

18 Claims, 4 Drawing Sheets

FIG.1
FIG.1A
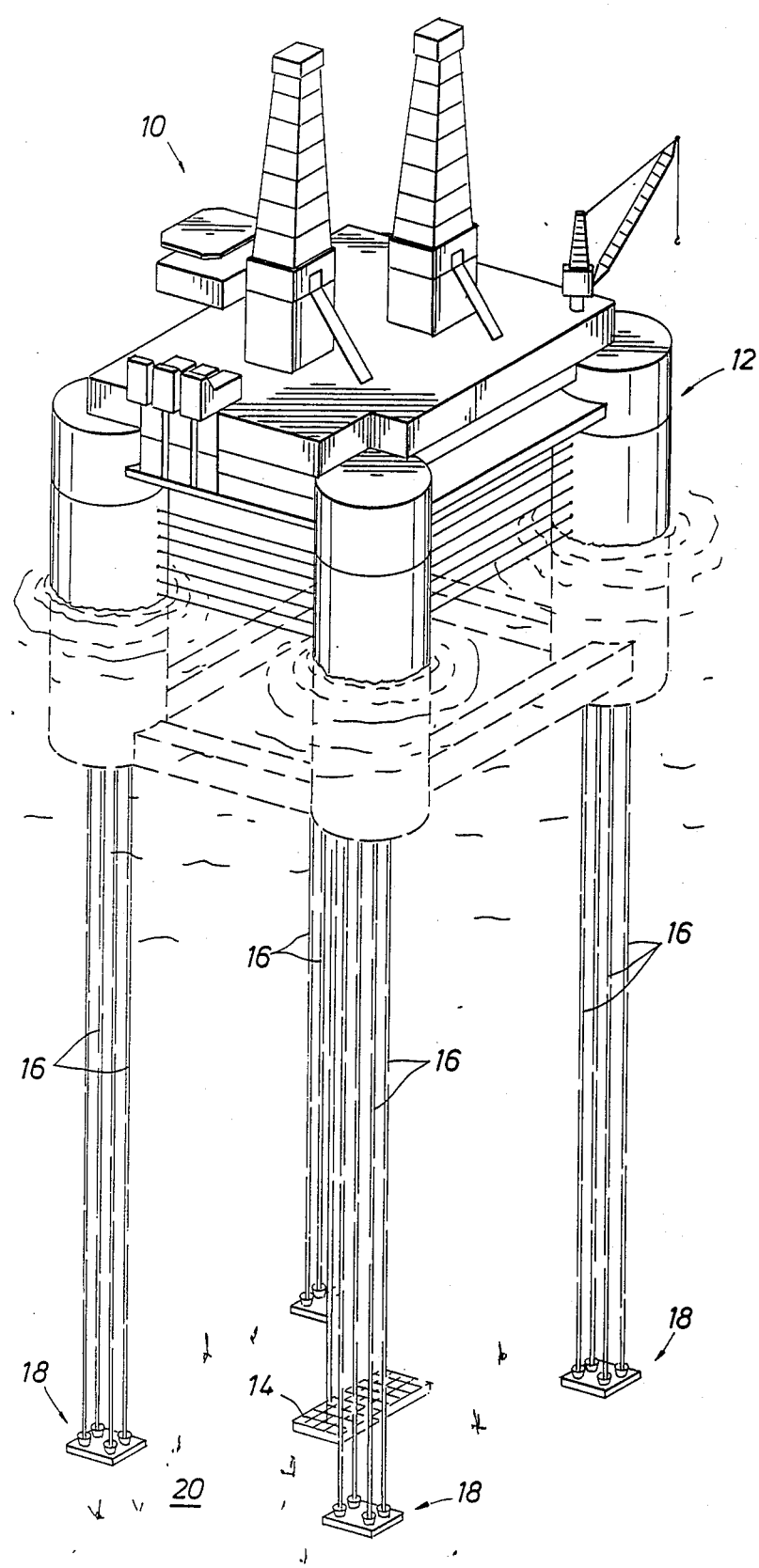
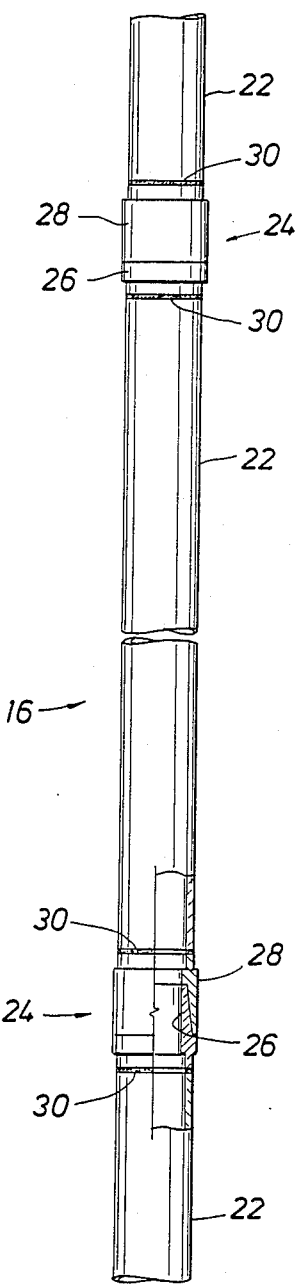

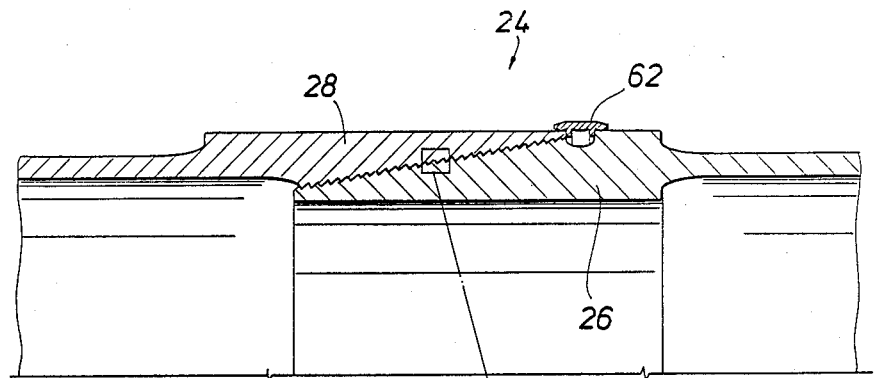
FIG. 3A
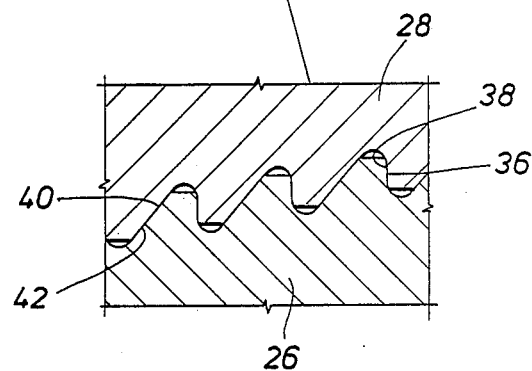
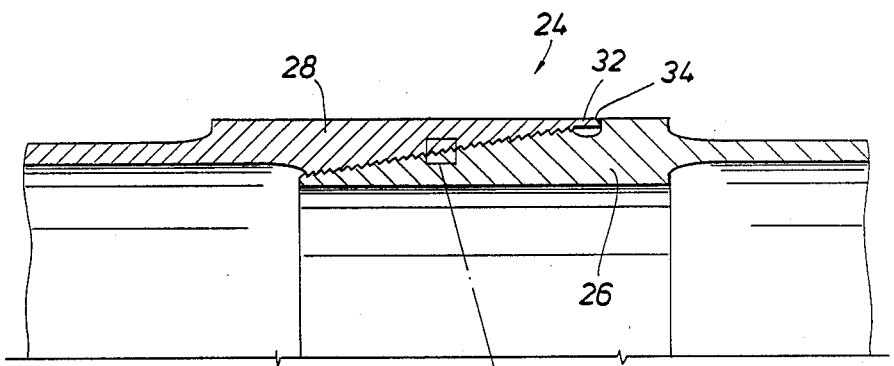
FIG. 3B
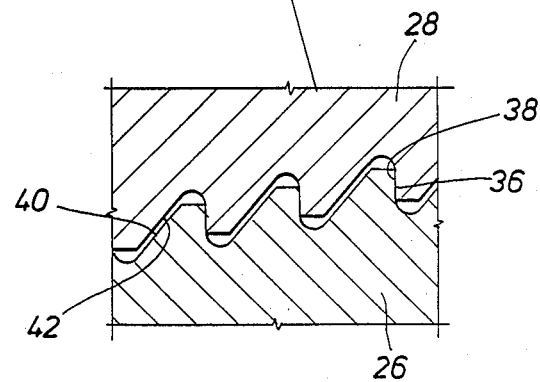

FIG. 4A
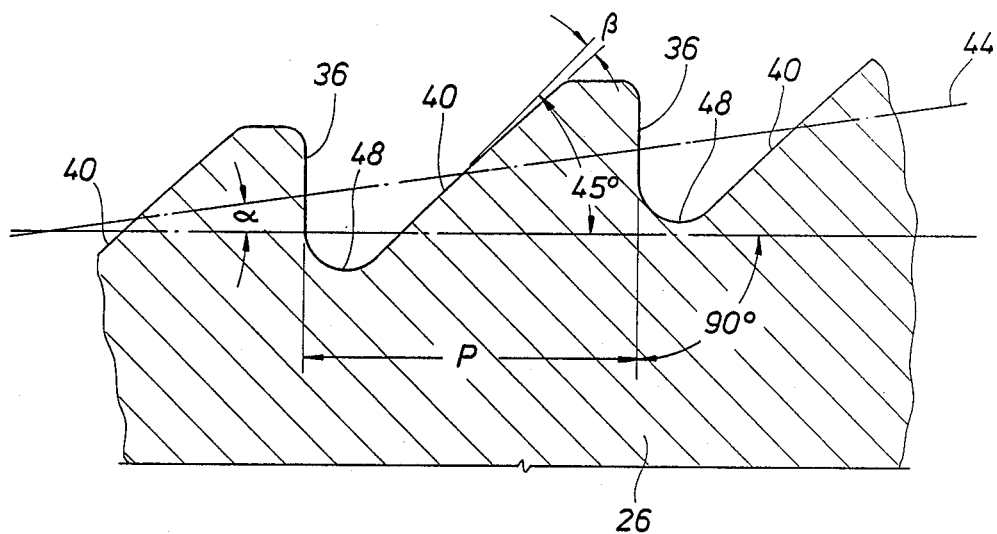
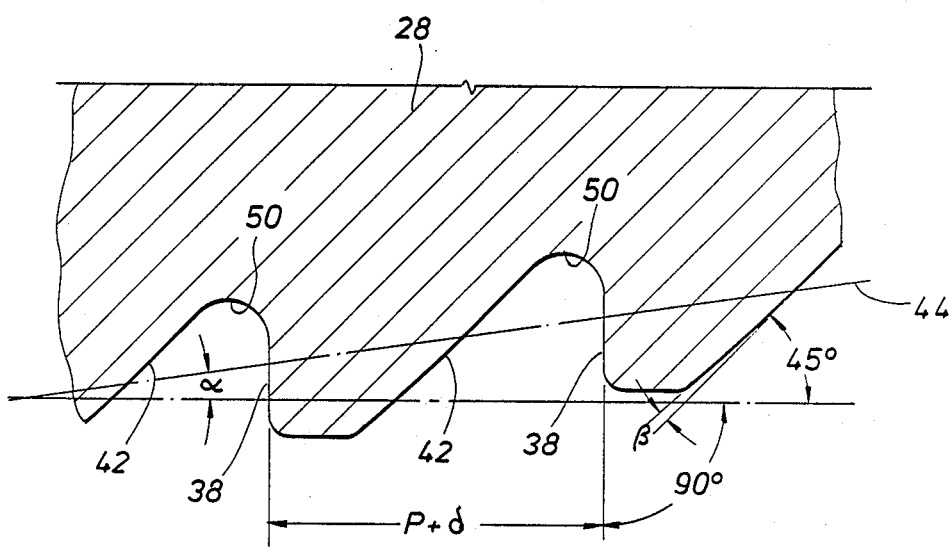
FIG. 4B

4,892,337

FATIGUE-RESISTANT THREADED CONNECTOR

FIELD OF THE INVENTION

This invention relates generally to threaded connectors or couplings for use in connecting adjacent sections of a tubing string. More particularly, but not by way of limitation, the invention pertains to a fatigue-resistant threaded connector for use in connecting adjacent sections of a tubing string which is subject to cyclic stress variations.

BACKGROUND OF THE INVENTION

Threaded connectors or couplings for use in connecting adjacent sections of a tubing string are well known. In the oil and gas industry, threaded connectors have long been used in a wide variety of applications, such as connecting adjacent sections of a well casing, a drill string, or a pipeline.

Typically, a threaded connector is designed to resist static loads and to provide a reliable, pressure-tight seal. The static load applied to a threaded connector may be very large, as in a well casing or a drill string where the connector may be required to support the weight of as much as a thousand feet or more of heavy steel tubing. Further, a well casing may be used to produce caustic or corrosive fluids which are at extremely high temperatures and pressures. The threaded connectors used in such a well casing must prevent leakage of these fluids into low pressure strata and fresh water sands traversed by the wellbore.

In other applications, a threaded connector must also be able to withstand high-cycle dynamic variations in tensile and bending stresses. As is well known, these high-cycle dynamic stress variations can result in a fatigue failure of the connector. As more fully described below, examples of this type of connector are the threaded connectors used in a floating drilling riser or a tension-leg-platform tether.

In offshore floating drilling operations, a riser is used to guide the drill string into the subsea well and to provide a path for conducting the drilling fluid back to the vessel. The riser is connected at its lower end to the subsea wellhead and at its upper end to the floating drilling vessel. The weight of the riser and the drilling fluid contained therein is typically supported by large pneumatic or pneumatic/hydraulic tensioners located on the floating drilling vessel. These tensioners also compensate for vertical heave of the vessel due to the action of waves and tides.

The connectors used to connect adjacent sections of a floating drilling riser are subject to substantial variations in tensile and bending stresses resulting from lateral movements of the drilling vessel induced by wind, waves, and currents. Furthermore, in some areas of the world, such as offshore Brazil, the riser is subject to very high subsea currents which tend to cause it to vibrate laterally. The connectors used in the riser must be able to withstand these cyclic stress variations without fatigue failure.

A tension-leg-platform (hereinafter referred to as a "TLP") is an offshore structure designed to have a compliant rather than a rigid response to environmental forces such as wind, waves, and currents. Typically, a TLP has a buoyant main body (the "hull") which floats on the surface of the body of water and supports the drilling rigs and other equipment used in petroleum drilling and producing operations. The hull is secured to a foundation on the floor of the body of water by a set of substantially vertical tendons or tethers. Each tether typically comprises a series of elongated tubing sections connected by threaded or bolted connectors. The length of the tethers is carefully adjusted to ensure that the hull is maintained at a somewhat greater draft than would be the case were it unrestrained. The resulting excess buoyancy of the hull exerts an upward load on the tethers, maintaining them in tension. The tensioned tethers restrict pitch, roll, and heave of the hull in response to environmental forces while maintaining the hull in position above the subsea wells. However, the environmental forces acting on the hull result in cyclic variations in tensile and bending stresses in the tethers. The connectors used to connect adjacent sections of the tethers must be capable of withstanding these cyclic stress variations without fatigue failure for the anticipated lifetime of the TLP, which may be as long as twenty years or more.

One method for avoiding fatigue failures in a threaded connector is to use a massive connector. An example of this method is illustrated in U.S. Pat. No. 4,708,513 issued Nov. 24, 1987 to Roche et al. Use of a massive connector results in a decrease in the average stress levels in the connector and, accordingly, an increase in the expected fatigue life of the connector. However, this method results in an inefficient solution to the fatigue problem. Further, the excess weight of the connector can be a problem in situations where the overall weight of the tubing string is critical, such as a TLP tether or a floating drilling riser.

Accordingly, there is a need for a low weight, fatigue-resistant threaded connector for use in a tubing string which is subject to cyclic stress variations.

SUMMARY OF THE INVENTION

The fatigue-resistant threaded connector of the present invention comprises a pin member which is threadedly engageable with a corresponding box member. The unthreaded ends of the pin member and box member are adapted to be butt welded to the adjacent tubing sections. The threaded portions of the pin member and the box member are frustoconically shaped, resulting in a tapered thread engagement. The load path of the axial loads carried by the connector passes approximately through the midpoint of the thread engagement thereby substantially minimizing moments due to discontinuities.

Preferably, the connector is radially preloaded (i.e., does not have any internal or external preload shoulders). This results in full thread engagement between the pin threads and the box threads, longer thread length, and thinner taper runout.

The preferred thread form is a modified buttress thread having a zero (or near zero) degree load flank (i.e., substantially perpendicular to the longitudinal axis of the connector), a 45 degree stab flank, and a large root radius. The thread may optionally include a small relief on the outer portion of the stab flank to reduce stress concentrations. This is especially useful for the radially preloaded embodiment of the connector, as more fully described below. Also, a small differential between the pitch of the pin threads and the pitch of the box threads may be used to compensate for the Poisson's ratio effect of the radial preload.

The connector includes an elliptical stress relief groove at the base of the pin threads, an elliptical stress relief transition at the base of the box threads, and elliptical contours for all thickness transitions. These elliptical surfaces serve to reduce peak stresses and to direct the load path toward the center of the connector.

The fully assembled and preloaded connector has a stress concentration factor less than 1.5 and a weight less than 2.5 times the weight of an equivalent length of tubing. Additionally, the connector is capable of carrying a larger static load than the tubing, and it has no tendency to fail by thread jump-out.

BRIEF DESCRIPTION OF THE DRAWINGS

The advantages of the present invention will be better understood by referring to the following detailed description and the attached drawings in which:

FIG. 1 is a perspective view of a typical TLP;

FIG. 1A is an elevation, in partial section, of a TLP tether using the threaded connectors of the present invention;

FIGS. 3A and 3B illustrate, respectively, a radially preloaded connector and an axially preloaded connector according to the present invention; and FIGS. 4A and 4B illustrate the modified buttress thread used in the preferred embodiments of the pin thread and the box thread, respectively, of the inventive threaded connector.

Figure 2:
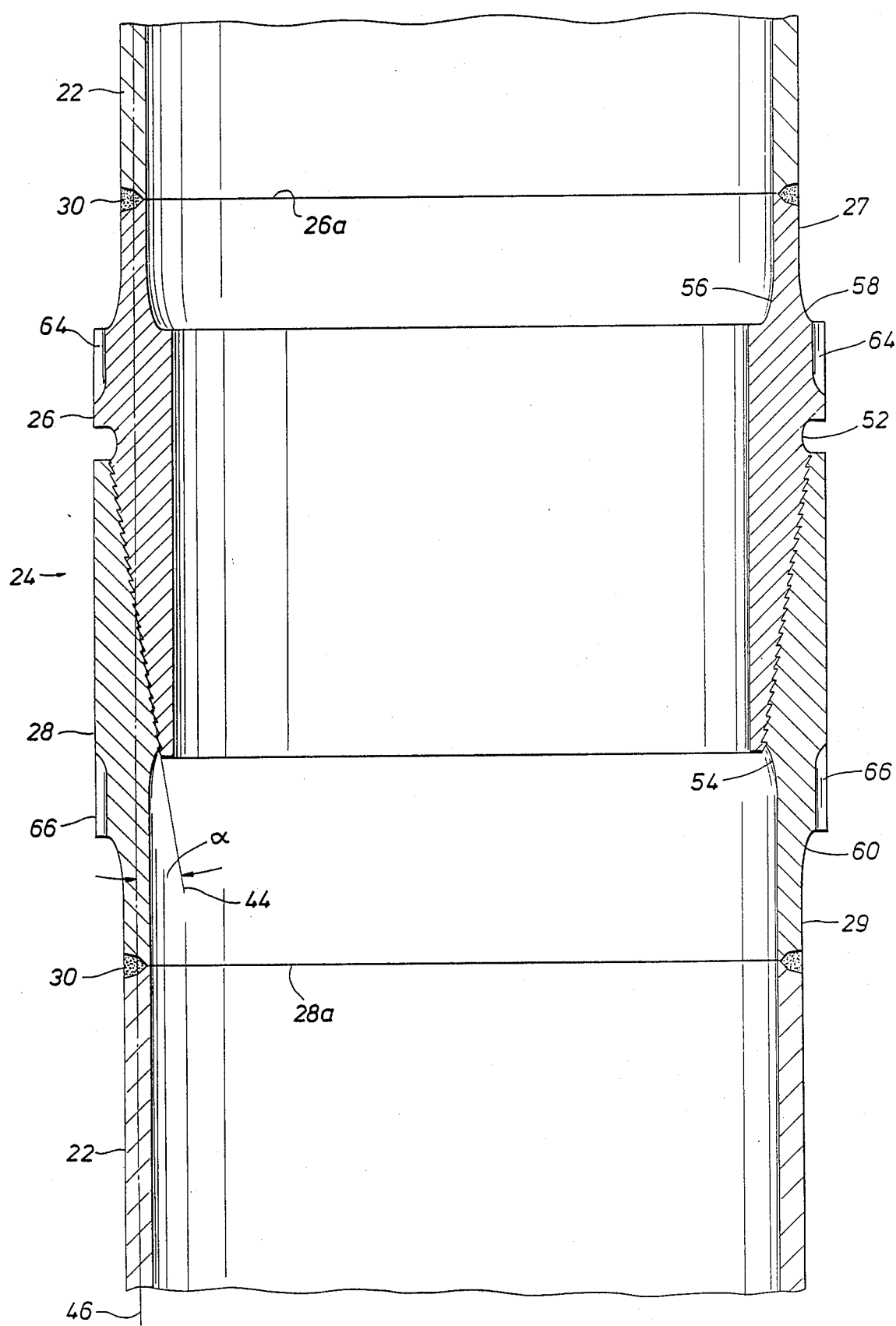
FIG. 2 is a cross section of a preferred embodiment of the inventive threaded connector.

While the invention will be described in connection with its preferred embodiments, it will be understood that the invention is not limited thereto. On the contrary, it is intended to cover all alternatives, modifications, and equivalents which may be included within the spirit and scope of the invention, as defined in the appended claims.

DETAILED DESCRIPTION OF THE PREFERRED EMBODIMENTS

The present invention is a fatigue-resistant threaded connector for use in connecting adjacent sections of a tubing string which is subject to cyclic variations in tensile and bending stresses. The invention will be described and illustrated herein as a threaded connector for use in a TLP tether; however, the invention can assume many other embodiments and can be used for a variety of other purposes. To the extent that the following detailed description is specific to a particular embodiment or a particular use of the invention, this is intended to be by way of illustration and not by way of limitation.

FIG. 1 illustrates a typical TLP, generally indicated at 10. TLP 10 consists of a buoyant hull 12 which is maintained in position above subsea well template 14 by a plurality of substantially vertical, tensioned tethers 16. Tethers 16 extend from hull 12 to foundation units 18 which typically are secured to the floor 20 of the body of water by a plurality of piles (not shown). As many as four or more separate tethers may be connected between each foundation unit 18 and hull 12.

According to the present invention, as illustrated in FIG. 1A, each tether 16 comprises a series of elongated tubing sections 22 connected in end-to-end relationship by the inventive threaded connectors 24. Each connector 24 comprises a pin member 26 which is threadedly engageable with a corresponding box member 28. The unthreaded ends of pin member 26 and box member 28 are butt welded, respectively, to the adjacent sections of tubing 22 by circumferential butt welds 30.

The tubing used for a TLP tether may be of any size desired. However, use of large diameter, thin wall tubing (e.g., 48" outside diameter by 1.625" wall) has the advantage that the tethers are nearly neutrally buoyant. Thus, for large diameter, thin wall tethers, the amount of buoyancy which the TLP hull must provide is relatively insensitive to the length of the tethers (i.e., the water depth).

Referring again to FIG. 1, tethers 16 are subject to substantial axial tensile stresses resulting from the excess buoyancy of hull 12. Further, as noted above, tethers 16 are also subject to cyclic variations in tensile and bending stresses resulting from the environmental forces acting on hull 12, as well as from lateral vibrations caused by subsea currents. Threaded connectors 24 must be capable of withstanding these dynamic stress variations without failure for the anticipated lifetime of TLP 10.

DESIGN CRITERIA

In designing a threaded connector for use in a tubing string which is subject to fatigue, the primary design criteria is that the threaded connector's expected (i.e., average) fatigue life should be at least as long as the expected fatigue life of all other parts of the tubing string. Typically, in a tubing string such as a floating drilling riser or a TLP tether, the parts of the tubing string having the shortest fatigue life, other than the connectors themselves, are the welds between the connector members and the tubing sections (e.g., butt welds 30 in FIG. 1A). Therefore, the connector should be designed so that its expected fatigue life is at least as long as the expected fatigue life of the welds. Generally, assuming high quality welds (i.e., two-sided, ground flush both inside and outside, fully inspected, and having minimal eccentricity), it is necessary for the threaded connector to have a stress-concentration-factor (SCF) less than or equal to about 1.5 in order for its expected fatigue life to be at least as long as the expected fatigue life of the welds. As used herein, the "stress-concentration-factor" or "SCF" of a threaded connector is defined as the maximum surface stress at a given location in the connector (e.g., the root of a thread) divided by the nominal stress in the tubing sections.

In a floating drilling riser or a TLP tether, the weight of the entire tubing string, including the connectors, must be supported by the buoyancy of the surface vessel or the TLP hull. Accordingly, to the extent possible without adversely affecting the connector's fatigue life, the weight of the connector should be minimized in order to maximize the payload capacity of the vessel or TLP.

Additionally, the static load capacity of the connector should be at least as large as the static load capacity of the tubing sections, and the connector must not be susceptible to failure by thread jump-out at the maximum design loads.

THE INVENTION

The inventive threaded connector satisfies the foregoing design criteria through use of a number of innovative features. As more fully described below, these features include use of a radial preload; a tapered thread engagement; a straight load path having substantially no eccentricity; a modified buttress thread; an elliptical stress relief groove and elliptical contours for all thickness transitions; and a small differential between the pitch of the pin threads and the pitch of the box threads to compensate for the axial strain resulting from the radial preload.

A preferred embodiment of the connector is illustrated in FIG. 2. As noted above, the connector 24 comprises a pin member 26 which is threadedly engageable with a corresponding box member 28. The unthreaded ends 26a and 28a of pin member 26 and box member 28 are butt welded, respectively, to the adjacent sections of tubing 22 by circumferential butt welds 30, which may be any suitable type of weld.

It should be noted that the weld shanks 27 and 29, respectively, of pin member 26 and box member 28 preferably have the same nominal inside and outside diameters as the tubing sections 22. This will permit the connector members to be butt welded to the tubing sections. Butt welds are preferred to other types of welds since they permit a straight load path from the tubing sections into the connector members.

As is well known in the art, make-up specifications for threaded connectors typically include a certain amount of preload, which is the load applied to the connector after it has reached the "hand-tight" condition, but before application of the operating loads. Hand-tight means that the connector members have been threadedly engaged to the point where they cannot be further engaged without deforming the connector members. At this point, additional tightening of the connector will result in tensile stresses and strains in one of the connector members and compressive stresses and strains in the other connector member. The preload induces a stress state in the connector members which beneficially changes the response of the connector to the operating loads. This is because application of a given operating load to a preloaded connector will result in less stress variation than application of the same operating load to a non-preloaded connector. Since the fatigue life of a properly designed connector is inversely proportional to the stress range resulting from the operating loads, a preloaded connector will have a longer fatigue life than a non-preloaded connector for the same operating loads.

Threaded connectors are generally designed to be either axially preloaded or radially preloaded. An axially preloaded connector utilizes contacting shoulders or surfaces on the pin and box to limit relative axial movement between the pin and box after these surfaces have come into contact. For example, for a connector with external preload shoulders or surfaces, after the preload surfaces have come into contact, additional tightening of the connector will result in an axial compressive stress and strain in the box and an axial tensile stress and strain in the pin rather than in additional relative axial movement between the pin and the box. If the preload surfaces are internal rather than external, the preload stresses and strains in the pin and box will be the reverse of those for external preload surfaces (i.e., axial compression in the pin and axial tension in the box).

A radially preloaded connector does not have external or internal preload shoulders or surfaces. After the connector is hand-tight, additional tightening will result in a compressive hoop stress and strain in the pin and a tensile hoop stress and strain in the box, and the pin will continue to advance into the box.

In its preferred embodiment, the threaded connector of the present invention is radially preloaded, as illustrated in FIGS. 2 and 3A; however, the connector may be designed to be axially preloaded, as illustrated in FIG. 3B, without departing from the spirit and scope of the invention. Turning first to the axially preloaded embodiment in FIG. 3B, the box member 28 is illustrated as having a preload tang 32 on its outer end which contacts an annular preload shoulder 34 on pin member 26. After tang 32 has contacted shoulder 34, additional tightening of connector 24 will result in an axial compressive stress and strain in the threaded portion of box member 28 and an axial tensile stress and strain in the threaded portion of pin member 26. As illustrated in the enlarged view of the thread cross section, after make-up (i.e., assembly and preload) of an axially preloaded connector, only the load flanks 36 and 38 of the pin thread and box thread, respectively, are in contact. Typically, a small gap remains between the stab flanks 40 and 42 of the pin thread and the box thread.

Turning now to FIG. 3A, in the radially preloaded embodiment of the invention, box member 28 does not have a preload tang. After the connector 24 has been assembled to hand-tight, additional tightening will draw the pin further into the box in an axial direction. However, additional tightening will also result in a tensile hoop stress and strain in the box member 28 and a compressive hoop stress and strain in the pin member 26. As illustrated in the enlargement of the thread cross section, following make-up of a radially preloaded connector, both the load flanks 36 and 38 and the stab flanks 40 and 42 of the pin thread and the box thread, respectively, are in contact. In other words, there is full thread engagement between the pin threads and box threads. Additionally, use of radial preload eliminates the need for internal or external preload shoulders, resulting in longer thread length and thinner taper runout. The increased thread length lowers the load per thread, and the thinner runout improves the uniformity of thread load. Finally, with radial preload, heat can be used to assist in disassembly of the connector should this become necessary. The heat will cause the box member 28 to expand, thereby relieving both the tensile hoop stress and strain in the box member 28, and the compressive hoop stress and strain in the pin member 26. Conversely, heating an axially preloaded connector with an external preload shoulder, such as illustrated in FIG. 3B, will result in increasing rather than relieving the stresses and strains in both the pin and box.

Returning to FIG. 2, it can be seen that the threaded surfaces of the pin member 26 and the box member 28 are generally frustoconically shaped. Thus, the pitch line 44 of the threads is inclined or tapered at an angle $\alpha$ with respect to the longitudinal axis of the connector, resulting in a tapered thread engagement. Typically, angle $\alpha$ would be approximately 10°; however other tapers may be used if desired.

It can also be seen from FIG. 2 that line 46 which represents the midpoint of the walls of tubing sections 22 and, accordingly, the approximate load path of the axial loads carried by the tethers, passes approximately through the midpoint of the thread engagement. Thus, there is no significant eccentricity between the load path and the thread engagement, and moments due to discontinuities are negligible.

FIGS. 4A and 4B illustrate the preferred thread profile for pin member 26 and box member 28, respectively. As illustrated, the thread is a modified buttress thread having a zero degree load flank (indicated at 36 for the pin and 38 for the box), a 45 degree stab flank (indicated at 40 for the pin and 42 for the box), and a large root radius (indicated at 48 for the pin and 50 for the box). It should be noted that the load flank angle may vary a few degrees (either plus or minus) from zero degrees without departing from the present invention. The stab flank angle may be varied as desired; although approximately 45 degrees appears to be preferable. The zero (or near zero) degree load flank ensures that the axial load on the connector does not produce any significant radial components which would tend to separate the pin and the box. This, in conjunction with a generous load face and a relatively stiff pin and box, prevents thread jump-out, as more fully discussed below. The 45 degree stab flank allows a large root radius without significantly increasing the thread depth and provides a radial contact surface between the pin and box which is necessary for the radially preloaded embodiment of the connector.

The stab flank may optionally include a small relief $\beta$ extending outwardly from approximately the point where the pitch line 44 intersects the stab flank. Relief $\beta$ would typically be on the order of from 1 to 3 degrees, however other relief angles may be used if desired. For a radially preloaded connector, use of a stab flank relief can prevent galling in the thread root by the outer edge of the stab flank and thereby reduce the maximum SCF in the fully assembled connector by as much as 6 to 7 percent, especially where the stab flank angle is slightly greater than specified due to machining tolerances.

Turning once again to FIG. 2, it can be seen that the outer surface of pin member 26 includes an elliptical stress relief groove 52 at the base of the pin threads. Similarly, box member 28 includes an elliptical stress relief transition 54 at the base of the box threads. Additionally, elliptical contours 56, 58, and 60 are used at all thickness transitions between stab flanks 27 and 29 and the threaded portions of the connector members. It has been shown that for a particular transition length, an elliptical contour has significantly lower peak stresses than a circular or other contour. The stress relief groove 52, stress relief transition 54, and the elliptical thickness transitions 56, 58, and 60 serve to direct the load toward the center of the connector members. This, combined with the tapered thread engagement, produces a nearly uniform thread load distribution and a corresponding uniform SCF distribution.

As noted above, make-up of a radially preloaded connector results in a tensile hoop stress in the box and a compressive hoop stress in the pin. As is well known by those skilled in the art, the tensile hoop stress in the box will result in a very small axial shortening (a "compressive strain") of the threaded portion of the box due to the Poisson's ratio effect. Similarly, the compressive hoop stress in the pin will result in a very small axial lengthening (a "tensile strain") of the threaded portion of the pin. As indicated in FIGS. 4A and 4B, these axial strains can be compensated for by use of a small differential $\delta$ between the pitch P of the pin thread and the pitch P+$\delta$ of the box thread in their unassembled condition. The differential $\delta$ should be approximately equal to the sum of the anticipated pin and box axial strains which will result from full radial preload of the connector. Use of the differential pitch will reduce the SCF of the fully assembled and preloaded connector. A differential pitch could also be used with an axially preloaded connector; however, in that case the differential $\delta$ would be significantly larger than in the radially preloaded connector since in the axially preloaded connector the axial tensile and compressive strains in the pin and box are the direct result of the axial preload rather than the indirect result (i.e., the Poisson's ratio effect) of a radial preload.

A variety of methods may be used to seal the connector. In the axially preloaded embodiment, sealing may be accomplished through the use of o-rings or seal rings at or near the preload shoulders or simply by contact between the preload surfaces. In the radially preloaded embodiment, a radial metal-to-metal seal ring, such as seal ring 62 in FIG. 3A, may be used. However, in the radially preloaded embodiment, the preferred method for sealing the connector would be through the use of a premium thread sealant, such as a self-curing, Teflon-filled, low strength anaerobic thread sealant. Such sealants are well known to those skilled in the art and, accordingly, will not be further described herein. As illustrated in the enlarged portion of FIG. 3A, for a radially preloaded connector, both the load flanks and the stab flanks of the threads are in contact. Thus, the only path for leakage through the connector is the helical path provided by the thread roots. A premium thread sealant should have little difficulty in sealing this path.

As noted above, the connector must not be susceptible to failure by thread jump-out, a failure of the connector in which the axial load on the threads causes the connector to deform enough that it simply pulls apart. Typically, this deformation of the connector is caused by the radial component of the axial load resulting from the inclined load flanks of standard thread forms. Use of a load flank which is substantially perpendicular to the longitudinal axis of the tubing string will substantially eliminate these radial components of the axial load. This, combined with a relatively stiff pin and box, will substantially eliminate failure by thread jump-out. Tests have shown that the present inventive connector has no tendency to fail by thread jump-out.

A finite element plastic analysis was conducted to determine the static load capacity of the inventive threaded connector. Results of this analysis showed that there is no yielding in the connector at the maximum design stress of the tubing sections. Due to the uniform stress distribution in the threads of the connector and the low SCF of the connector, the stress at the thread roots does not reach yield, even at the yield stress of the tubing. Thus, the static load capacity of the connector is larger than that of the tubing sections.

A variety of methods may be used to assemble the connector. For example, as illustrated in FIG. 2, the pin member 26 and box member 28 may each be provided with a plurality of longitudinal splines 64 and 66, respectively, spaced around the periphery of the connector members. A spanner wrench may then be used to grip these splines and apply torque to the connector members. Alternatively, a circumferential band wrench (such as an automobile oil filter wrench) could be used. Other ways of assembling the connector will be apparent to those skilled in the art.

The connector described above may be used to connect adjacent sections of any size of tubing. However, for purposes of illustration and not limitation, it will be assumed that the tubing string is a large diameter, thin wall (e.g., 48" outside diameter by 1.625" wall) TLP tether. In this case, for a radially preloaded connector as illustrated in FIG. 2, the connector's outside diameter is about 51.75 inches, the inside diameter of the pin is about 41.25 inches and the fully assembled length of the connector is about 54 inches. The length of the weld shank on each of the connector members is about 9 inches. The nominal pitch P of the connector threads is 0.7500 inches with the differential δ being about 0.0002 inches per thread. The root radius is approximately 0.095 inches and thread height (root to crest) is about 0.300 inches. The specified preload is approximately 60 degrees of rotation beyond the hand-tight position. This results in a connector having a maximum SCF when fully assembled and preloaded of only about 1.4. Additionally, the weight of the fully assembled connector is only about 2.4 times that of an equivalent length of tubing 22, its static load capacity is greater than that of tubing 22, and it has no tendency to fail by thread jump-out. Thus, the threaded connector of the present invention satisfies the design criteria outlined above.

As noted above, the weight of the fully assembled connector is only about 2.4 times the weight of an equivalent length of tubing. Obviously, the ratio of the connector's fully assembled weight to the weight of an equivalent length of tubing is dependent on the length of the weld shanks (e.g., weld shanks 27 and 29 in FIG. 2) on the connector members. However, where the combined length of the two weld shanks does not exceed about one-third of the total assembled length of the connector, 2.4 is an extremely low weight ratio, especially for a fatigue-resistant connector.

The threaded connector of the present invention has been described in connection with its preferred embodiments. However, it is not limited thereto. Many changes and modifications to the basic design will be obvious to those skilled in the art having the benefit of the foregoing teachings. For example, an elliptical profile could be used for the thread root. All such changes and modifications are intended to be within the scope of the invention which is limited only by the following claims.

We claim:

1. A threaded connector for use in connecting adjacent sections of tubing in a tubing string, said tubing having an inside diameter, an outside diameter, and a wall thickness, said tubing string having a longitudinal axis, said threaded connector comprising:
   (a) a generally tubular pin member having first and second ends, said first end of said pin member adapted to be welded to a first section of said tubing, at least a portion of said pin member having a generally frustoconical outer surface which tapers radially inwardly toward said second end of said pin member, said frustoconical outer surface having a thread formed thereon;
   (b) a generally tubular box member having first and second ends, said first end of said box member adapted to be welded to a second section of said tubing, at least a portion of said box member having a generally frustoconical inner surface which tapers radially outwardly toward said second end of said box member, said frustoconical inner surface having a thread formed thereon which corresponds to and is threadedly engagable with said thread formed on said pin member;
   (c) said thread formed on said pin member and said thread formed on said box member being modified buttress threads having a load flank substantially perpendicular to said longitudinal axis of said tubing string;
   (d) said threaded connector adapted to be radially preloaded upon assembly and having a tapered thread engagement oriented so that the midpoint of said tapered thread engagement is located at approximately the same radial distance from said longitudinal axis of said tubing string as the midpoint of said wall thickness of said tubing, whereby there is a substantially straight load path with substantially no eccentricity through said threaded connector.

2. The threaded connector of claim 1 wherein said pin member and said box member each has an annular preload surface formed thereon substantially perpendicular to said longitudinal axis of said tubing string, said annular preload surfaces adapted to come into contact when said pin member and said box member have been fully engaged, whereby additional tightening of said pin member and said box member will result in axially preloading said threaded connector.

3. The threaded connector of claim 1 wherein said thread formed on said pin member and said thread formed on said box member each has a pitch length, and wherein the pitch length of said thread formed on said box member is equal to the pitch length of said thread formed on said pin member plus a differential to compensate for axial strains in said pin member and said box member resulting from the Poisson's ratio effect of the radial preload.

4. The threaded connector of claim 1 wherein said thread formed on said pin member and said thread formed on said box member further comprise a stab flank relief extending outwardly from approximately the midpoint of said stab flank.

5. The threaded connector of claim 4 wherein said stab flank relief is between about one and about three degrees.

6. The threaded connector of claim 1 wherein said pin member further comprises a weld shank at said first end of said pin member, and wherein said box member further comprises a weld shank at said first end of said box member, said weld shanks having inside and outside diameters substantially similar to those of said tubing.

7. The threaded connector of claim 6 wherein all internal and external thickness transitions between said weld shanks and said connector members have elliptical cross sections.

8. The threaded connector of claim 6 wherein the total combined length of said weld shanks does not exceed one-third of the total assembled length of said threaded connector, and wherein the weight of the assembled connector does not exceed 2.5 times the weight of an equivalent length of said tubing and the stress concentration factor of the assembled and preloaded connector does not exceed 1.5.

9. The threaded connector of claim 1 wherein said pin member further comprises an annular stress relief groove formed at the base of said frustoconical outer surface, said stress relief groove having an elliptical cross section.

10. The threaded connector of claim 1 wherein said box member further comprises an annular stress relief transition at the base of said frustoconical inner surface, said stress relief transition having an elliptical cross section.

11. A threaded connector for use in connecting adjacent sections of tubing in a tubing string, said tubing having an inside diameter, an outside diameter, and a wall thickness, said tubing string having a longitudinal axis, said threaded connector comprising:
   (a) a generally tubular pin member having a weld shank at one end thereof and a threaded portion at the second end thereof, said weld shank having inside and outside diameters substantially similar to those of said tubing and adapted to be welded to a first section of said tubing, said threaded portion having a generally frustoconical outer surface which tapers radially inwardly toward said second end of said pin member, said frustoconical outer surface having a thread formed thereon;

(b) a generally tubular box member having a weld shank at one end thereof and a threaded portion at the second end thereof, said weld shank having inside and outside diameters substantially similar to those of said tubing and adapted to be welded to a second section of said tubing, said threaded portion having a generally frustoconical inner surface which tapers radially outwardly toward said second end of said box member, said frustoconical inner surface having a thread formed thereon which corresponds to and is threadedly engagable with said thread formed on said pin member;

(c) said thread formed on said pin member and said thread formed on said box member being modified buttress threads having a load flank substantially perpendicular to said longitudinal axis of said tubing string;

(d) said pin member and said box member adapted to be radially preloaded upon assembly;

(e) said threaded connector having a tapered thread engagement oriented so that the midpoint of said tapered thread engagement is located at approximately the same radial distance from said longitudinal axis of said tubing string as the midpoint of said wall thickness of said tubing, whereby there is a substantially straight load path with substantially no eccentricity through said threaded connector.

12. The threaded connector of claim 11 wherein the total combined length of said weld shanks does not exceed one-third of the total assembled length of said threaded connector, and wherein the weight of the assembled connector does not exceed 2.5 times the weight of an equivalent length of said tubing and the stress concentration factor of the assembled and preloaded connector does not exceed 1.5.

13. The threaded connector of claim 11 wherein said thread formed on said pin member and said thread formed on said box member each has a pitch length, and wherein the pitch length of said thread formed on said box member is equal to the pitch length of said thread formed on said pin member plus a differential to compensate for axial strains in said pin member and said box member resulting from the Poisson's ratio effect of the radial preload.

14. The threaded connector of claim 11 wherein said thread formed on said pin member and said thread formed on said box member further comprise a stab flank relief extending outwardly from approximately the midpoint of said stab flank.

15. The threaded connector of claim 14 wherein said stab flank relief is between about one and about three degrees.

16. The threaded connector of claim 11 wherein said pin member further comprises an annular stress relief groove formed at the base of said frustoconical outer surface, said stress relief groove having an elliptical cross section.

17. The threaded connector of claim 11 wherein said box member further comprises an annular stress relief transition at the base of said frustoconical inner surface, said stress relief transition having an elliptical cross section.

18. The threaded connector of claim 11 wherein all internal and external thickness transitions between said weld shanks and said threaded portions of said pin member and said box member have elliptical cross sections.

* * * * *